United States Patent

Saitoh et al.

[11] Patent Number: 5,815,495
[45] Date of Patent: Sep. 29, 1998

[54] SYSTEM FOR MANAGING COMMUNICATIONS BETWEEN ADAPTERS

[75] Inventors: Youichi Saitoh, deceased, late of Zama, Japan, by Aeko Saitoh, Keisuke Saitoh, Akiko Saitoh, heirs; Naotaka Aoki, Yokohama, Japan; Kian-Bon K. Sy, Cary, N.C.

[73] Assignee: International Business Machines Corporation, Armonk, N.Y.

[21] Appl. No.: 425,541

[22] Filed: Apr. 20, 1995

[30] Foreign Application Priority Data

Apr. 28, 1994 [JP] Japan .................................. 6-091699

[51] Int. Cl.⁶ ........................................ H04Q 9/00
[52] U.S. Cl. ........................... 370/249; 370/475; 370/420
[58] Field of Search .................. 370/13, 14, 15, 370/16, 60, 60.1, 94.2, 110.1, 420, 242, 243, 245, 246, 247, 249, 395, 397, 252, 474, 475; 371/8.2, 16.1, 20.5, 68.2; 379/27, 5, 22, 32, 34; 340/825.06, 825.07, 825.52; 375/222

[56] References Cited

U.S. PATENT DOCUMENTS

| | | | |
|---|---|---|---|
| 4,751,510 | 6/1988 | De Saint Michel et al. | 375/222 |
| 4,761,646 | 8/1988 | Choquet et al. | 370/13 |
| 5,210,740 | 5/1993 | Anzai et al. | 370/16 |
| 5,251,207 | 10/1993 | Abensour et al. | 370/60.1 |
| 5,490,140 | 2/1996 | Abensour et al. | 370/60.1 |
| 5,515,418 | 5/1996 | Yamaguchi et al. | 370/16 |

OTHER PUBLICATIONS

IBM Technical Disclosure Bulletin, vol. 24, No. 11B, Apr. 1982, pp. 6088–6089.
IBM Technical Disclosure Bulletin, vol. 32, No. 3 A, Aug. 1989 pp. 295–299.

*Primary Examiner*—Chau Nguyen
*Attorney, Agent, or Firm*—Gerald R. Woods

[57] ABSTRACT

To efficiently diagnose local and remote adapters without using dedicated hardware in a communication network to which a plurality of terminals are connected through associated adapters, a local logical address which is different from logical addresses reserved for communication between the terminals, is assigned to communication with a local adapter, and a frame including the local logical address and a diagnostic command is transmitted to the local adapter. When a remote adapter is to be diagnosed, a frame including a logical address assigned to communication with a remote terminal associated with that remote adapter, a diagnostic command, and at least one invalid character, is sent out from the local adapter to the network.

4 Claims, 6 Drawing Sheets

SYSTEM FOR MANAGING COMMUNICATIONS BETWEEN ADAPTERS

FIELD OF THE INVENTION

The present invention relates to data communication management, and more particularly to a communication management system for a network in which a plurality of data terminals (DTEs) communicate with each other in a frame format through associated adapters.

BACKGROUND OF THE INVENTION

For a network in which multiple DTEs communicate with each other through associated adapters, various communication management techniques have been proposed and implemented to improve reliability of the communication. Adapter diagnosis operations including a loopback test is a typical example of such communication management. In a communication network in which devices communicate using frames of control information and data, the adapter diagnosis is generally performed by transmitting a frame including an address of an adapter to be diagnosed and a diagnostic command from a host, DTE, dedicated diagnostic device or the like.

A considerable number of articles relating to the diagnosis of the adapters or modems in a communication network have been published. For example, IBM Technical Disclosure Bulletin, Vol. 24, No. 11B, April 1982, pp. 6088–6089, discloses a stand-alone diagnostic equipment comprising an transmitter section including two programmable read only memories (PROMs), and a receiver section including a PROM and a random access memory (RAM). This diagnostic equipment is connected to a local modem via an ordinary CCITT interface and transmits an SDLC frame which includes an address of a modem to be tested and a test code. The test code can specify a local modem self-test, local modem status report, local loopback test, remote modem self-test, remote modem loopback test and so on. Also, IBM Technical Disclosure Bulletin, Vol. 32, No. 3A, August 1989, pp. 295–299, discloses a loopback test method for a V.54 data communication equipment (DCE). This method tests local and remote DCEs by using DCE addresses and dedicated lines.

Besides the above described adapter diagnosis equipment, a frame relay service has been recognized as a high speed data communication service. Such a service relays variable length frames by using logical addresses called Data Link Connection Identifiers (DLCI). Since the communication processes for frame relay networks are simpler than those of some other networks, high speed communication is possible. To connect a DTE to a frame relay network, a signal conversion adapter such as a terminal adapter (TA) described in U.S. Pat. No. 5,251,207 is required. The TA in this patent may be connected not only to a frame relay network but also to a switched multimegabit data service (SMDS) network.

There are two methods for identifying communication partners in a frame relay network. One method assigns unique DLCI values respectively to all the DTEs connected to a frame relay network (global addressing), while the other method assigns different DLCI values to the respective communications between a specific DTE and the other DTEs. The global addressing requires a number of different DLCI values equal to the number of DTEs connected to the network, while the local addressing method may use the same DLCI value for each DTE. When an adapter is to be tested in such a frame relay network, a DLCI might be used as a network address of the adapter.

If adapter diagnosis including loopback tests is performed by using dedicated diagnostic devices or lines as in the prior art, the cost is significant since dedicated diagnostic hardware is required. Also, if a unique address is assigned to each adapter in a network, especially a public network, an extra fee is charged. Further, since the addresses are assigned for the sole purpose of adapter diagnosis, the DTE or host has to perform extra address management in addition to those required for normal data communication. Also, if an address of a terminal associated with the adapter is used for adapter diagnosis, a mechanism is required to distinguish between the normal data communication and adapter diagnosis.

It is therefore an object of the present invention to provide a communication management system by which local and remote adapters in a network can be diagnosed efficiently without using dedicated hardware.

SUMMARY OF THE INVENTION

The present invention is implemented in a communication network in which a plurality of terminals are connected through associated adapters and frames are transmitted between the terminals using uniquely assigned logical addresses. A local logical address which is different from logical addresses reserved for communication between the terminals, is assigned to communication between a local terminal and an associated local adapter. The local or remote adapter is diagnosed by transmitting to the local adapter a frame including the local logical address and an adapter diagnostic command from the local terminal. When a remote adapter is to be diagnosed, a remote logical address for the remote terminal associated with the remote adapter is inserted into the frame together with, or instead of, the local logical address. Further, when the remote adapter is to be diagnosed, at least one invalid character is inserted into the frame. The invalid character has a bit pattern which does not appear in a control field in a frame for the normal data communication. The invalid character is inserted into a position where the control field should be located.

In a first embodiment of the present invention, when a local adapter is to be diagnosed, the local terminal which performs diagnosis transmits a frame to the local adapter. The frame includes a local logical address, a diagnostic command, and a local indicator which indicates that the communication is with the local adapter. Upon detecting the local logical address and the local indicator in the received frame, the local adapter executes the specified diagnostic command without sending the frame to the network.

When a remote adapter is to be diagnosed, a different frame is transmitted first to the local adapter. This frame includes a local logical address, a diagnostic command, a remote indicator which indicates that the communication is intended for the remote adapter, and the remote logical address is transmitted to the local adapter. Upon detecting the local logical address and the remote indicator, the local adapter replaces the local logical address with the remote logical address, inserts invalid characters into predetermined positions, and transmits the frame to the network. When the remote adapter detects the remote logical address and the invalid characters, it executes the diagnostic command without transmitting the frame to an associated remote terminal. If no invalid character is detected in the frame, normal data communication is assumed and the remote adapter transmits the received frame to the associated remote terminal.

In an alternate embodiment of the present invention, a local terminal creates a frame including a logical address, one or more invalid characters, and a diagnostic command, and transmits it to a local adapter. The logical address is a local logical address when the local adapter is to be diagnosed while it is a remote logical address when a remote adapter is to be diagnosed. If the logical address in the received frame is a local logical address, the local adapter performs diagnosis without transmitting the frame to the network. If the logical address is a remote logical address, the local adapter transmits the received frame to the network, regardless of whether the invalid characters are included in the frame. The operation of the remote adapter is the same as that in the first embodiment.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
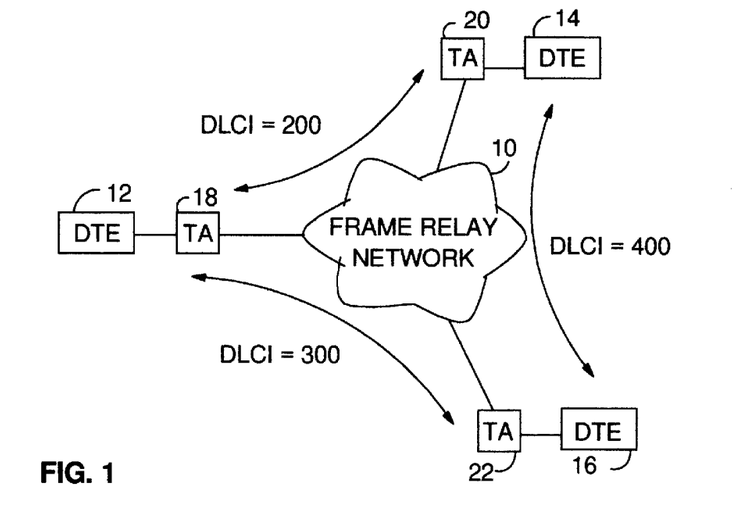
FIG. 1 is a block diagram showing the configuration of a network in which the present invention may be implemented.

An illustrative network to which the present invention can be applied is shown in FIG. 1.

Though a frame relay network is illustrated here, the present invention is not limited thereto. A plurality of data terminals (DTEs) 12, 14, and 16 are connected to the frame relay network 10 through respective terminal adapters (TAs) 18, 20, and 22. The DTEs communicate using data frames, each of which includes a logical address called a Data Link Connection Identifier (DLCI). As far as the present invention is concerned, either the global or local addressing systems utilizing the DLCIs may be used. In the following technical description, use of local addressing is assumed.

In a local addressing system, different DLCIs are assigned to the respective communication between a DTE and the other DTEs. In this embodiment, as shown by the bidirectional arrows in FIG. 1, it is assumed that a DLCI=200 is assigned to the communication between the DTEs 12 and 14, DLCI=300 to the communication between the DTEs 12 and 16, and DLCI=400 to the communication between the DTEs 14 and 16. Although such assignments have to be registered in the network, the assignments per se may be performed arbitrarily within a given range. For example, a switching equipment (not shown) of the network 10 receives a frame from the TA 18 and routes it to the TA 20 if DLCI=200, and to the TA 22 if DLCI=300. The routing between the TAs is accomplished by using a routing table which relates the DLCIs to particular destinations. Since the use of routing tables is well known and does not directly relate to the present invention, no detailed explanation of such tables will be given here.

Figure 2:
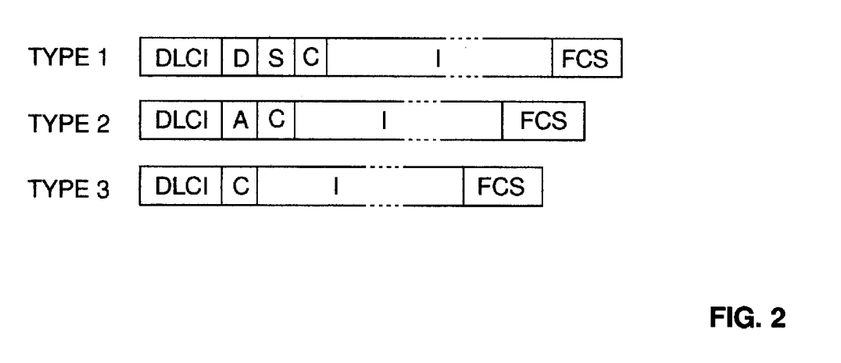
FIG. 2 is a diagram showing typical formats of frames which can be transmitted in the network shown in FIG. 1.

FIG. 2 shows formats of several types of frames which may be transmitted through the frame relay network 10. An actual frame includes a flag fields, each having a predetermined bit pattern, at both ends of the frame. The flag fields are not shown in the drawings. Each frame of the three types shown in FIG. 2 has a DLCI field at the head and a 2-byte (16-bit) frame check sequence (FCS) field at the end. The length of the standard DLCI field is 10 bits. In a Type 1 frame, the DLCI field is followed by a destination address field D, a source address field S, a control field C, and an information field I. In a Type 2 frame, a single address field A is included instead of the fields D and S in the Type 1 frame. In a Type 3 frame, no address field is included and the DLCI field is followed by a control field C. Each of the address and control fields has a fixed length of one byte (8 bits) while the information field I has a variable length. It should be noted that, in frame relay networks, a 2-byte field including the 10-bit DLCI field is identified as the frame's address field, and user data is contained in a succeeding variable length information field. Therefore, the D, S, A, C, and I fields shown in FIG. 2 are conventionally considered to be part of the information field for the frame.

Figure 3:
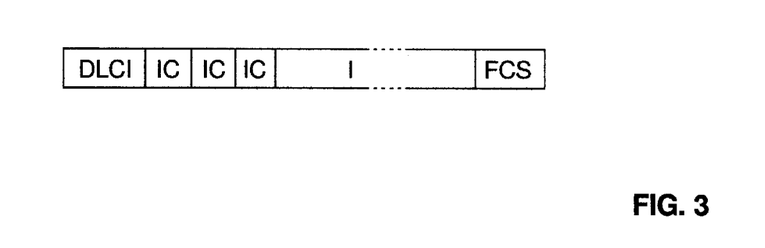
FIG. 3 is a diagram showing a frame format in which, according to the present invention, invalid characters are inserted into positions where control characters would normally be located.

Among the fields in the three types of frames shown in FIG. 2, the DLCI and control fields are important in the present invention. As for the DLCI field, when a DTE diagnoses an associated or local TA, a DLCI value which is not reserved for the communication between the DTEs is used, and when it diagnoses a remote TA, a DLCI value which is assigned to the communication with a remote DTE connected to the remote TA is used. The control field includes a predetermined bit pattern for defining a command and a response in normal data communications while the control field includes invalid characters having a bit pattern which is not reserved for normal control operations. In the conventional HDLC protocol, for example, X' F1' is an invalid character. As shown in FIG. 3, an invalid character IC is inserted into all the frame positions in which a conventional control character value should exist when any of the three types of frames are used for normal data communications. Thus, the normal data communication and the diagnosis of a TA can be clearly distinguished, regardless of which frame format is used.

Figure 4:
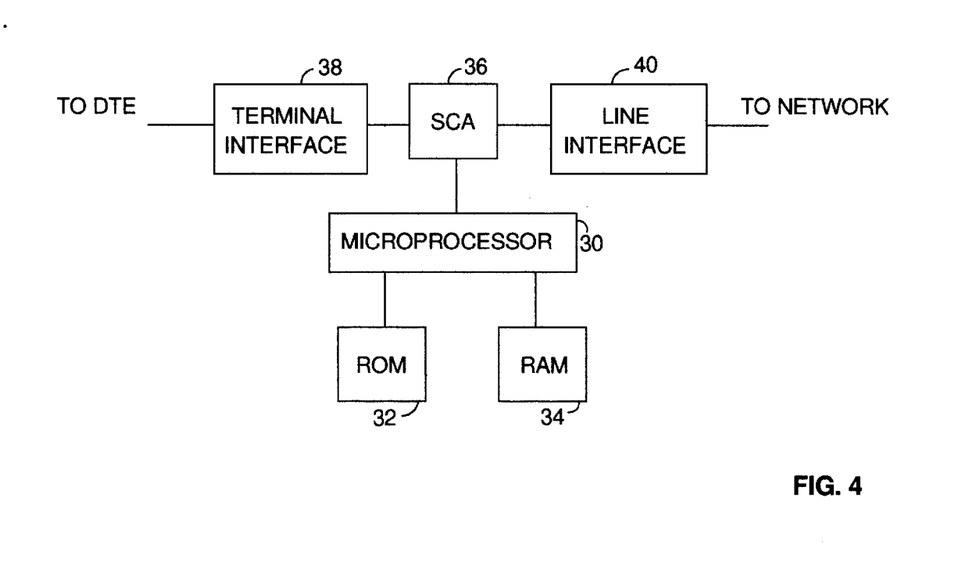
FIG. 4 is a block diagram of a terminal adapter (TA)

FIG. 4 shows the illustrative structure of a terminal adapter or TA suitable for use with the frame formats shown in FIGS. 2 and 3. The illustrated TA (e.g. TA 18) has a microprocessor 30 which controls the entire TA according to programs stored in a read only memory (ROM) 32. A random access memory (RAM) 34 and a serial communication adapter (SCA) 36 are connected to the microprocessor 30. The SCA 36 converts a serial signal received from an associated DTE (e.g. DTE 12) through a terminal interface 38 or from the network 10 through a line interface 40 into a parallel signal, and inputs it to the microprocessor 30. Further, the SCA 36 converts a parallel signal which is output by the microprocessor 30 into a serial signal, and sends it to the interface 38 or 40. Each component of the TA shown in FIG. 4 is readily available from commercial sources. In this embodiment, Motorola's MC68000, Hitachi's HD64570, Motorola's MC145407, and Rockwell's R8069B and R8070A were used as the microprocessor 30, SCA 36, terminal interface 38, and line interface 40, respectively.

Figure 5:
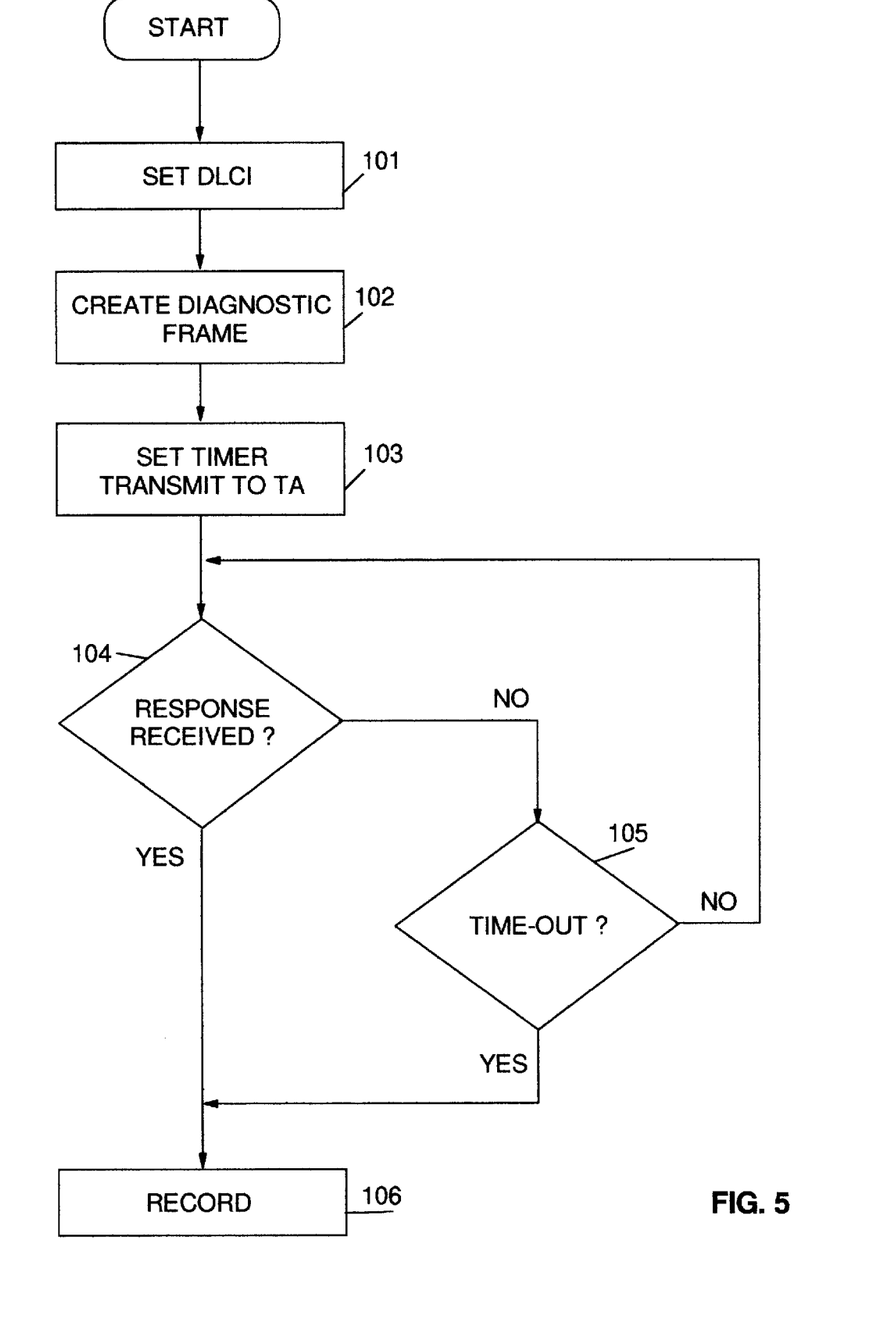
FIG. 5 is a flowchart showing operations of a diagnosing DTE when a TA is to be diagnosed according to the present invention.
Figure 6:
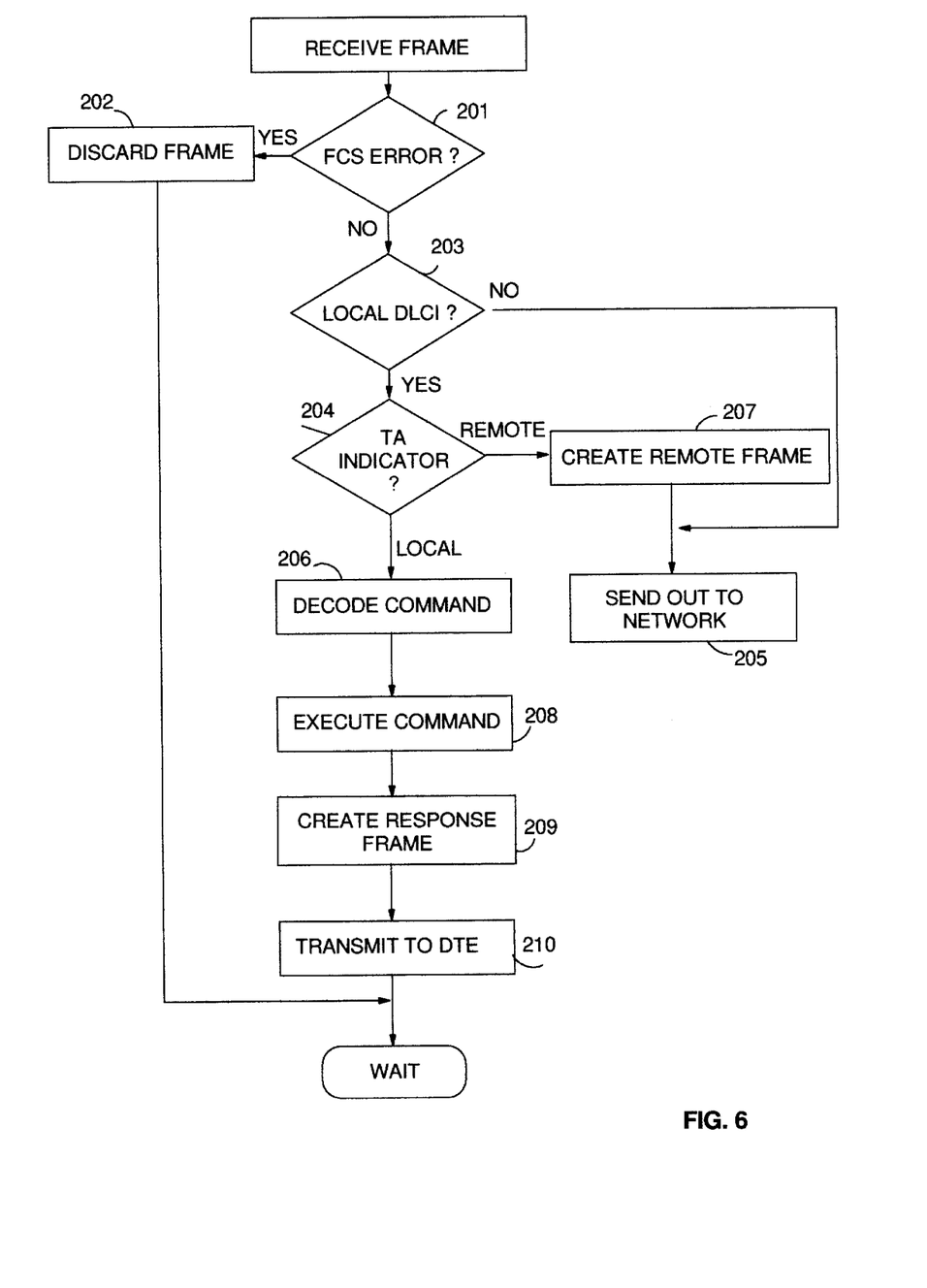
FIG. 6 is a flowchart showing operations of a local TA which has received a frame from a DTE.
Figure 7:
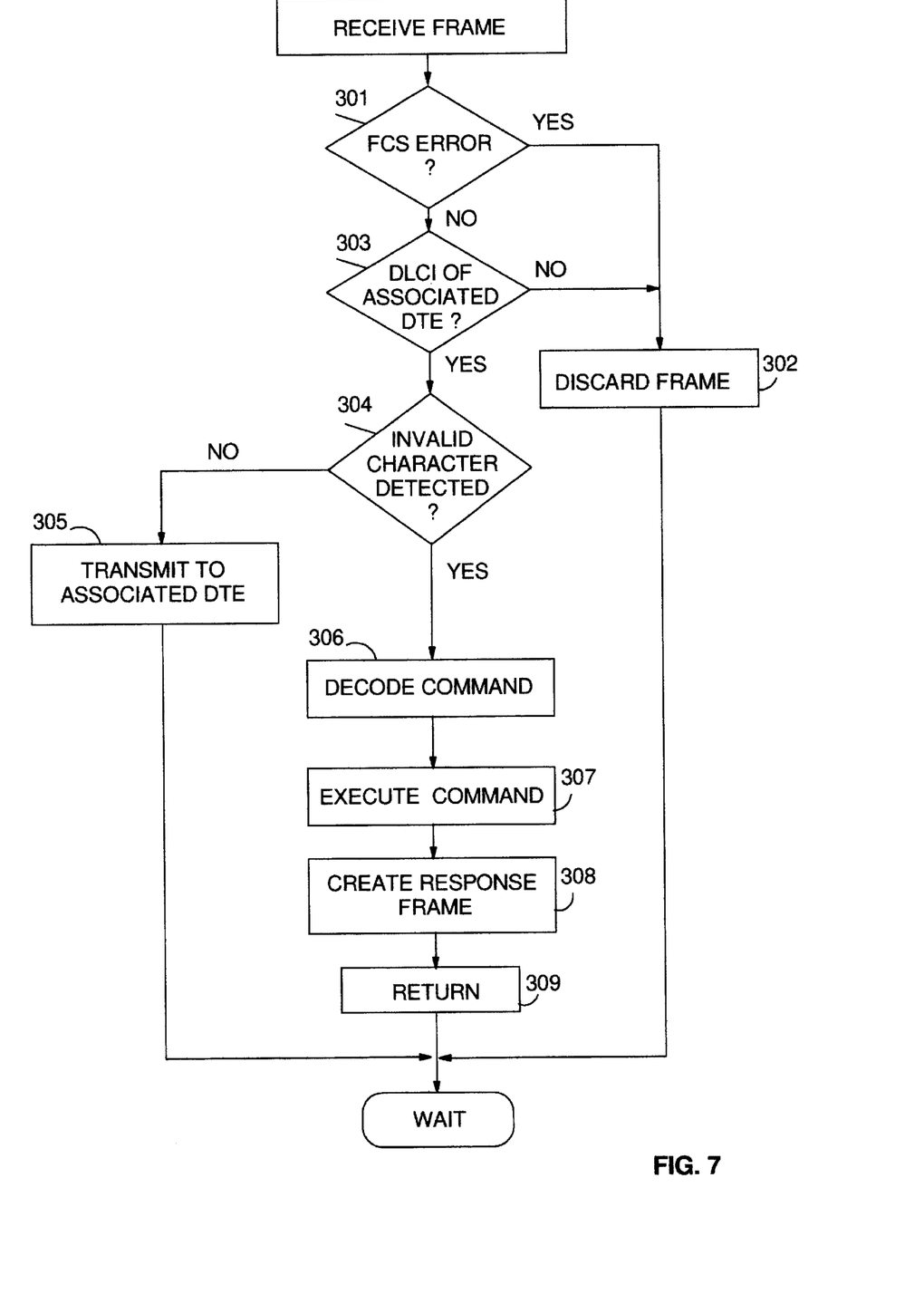
FIG. 7 is a flowchart showing operations of a remote TA which has received a frame from the network.

The first embodiment of the present invention will now be described with reference to flowcharts shown in FIGS. 5–7. FIGS. 5–7 show flows in a DTE which performs diagnosis, a local TA, and a remote TA, respectively. It is assumed hereinafter that the DTE 12 diagnoses the local TA 18 and remote TAs 20 and 22.

When a diagnostic program starts, the DTE 12 such as IBM 3745 Communication Controller sets a DLCI value at step 101 to transmit a frame to a TA to be diagnosed. The DTE 12 has a DLCI table in its memory (not shown) which shows the relationship between the TAs and DLCI values, and obtains a desired DLCI by accessing that table. In this embodiment, the relationship between the TAs and DLCIs, as viewed from the DTE 12, is as follows:

TA 18 . . . DLCI=14
TA 20 . . . DLCI=200
TA 22 . . . DLCI=300

In the above, the DLCI for transmitting a diagnostic frame to the TA 20 or 22 has been assigned to the communication with the DTE 14 or 16 as described above. For the communication with the local TA 18, a DLCI (14 in this case) which is not reserved for the communication between the DTEs is assigned. Since it is not necessary to register such a local DLCI in the network 10, it will not be charged by the service provider of the network 10.

Figure 8:
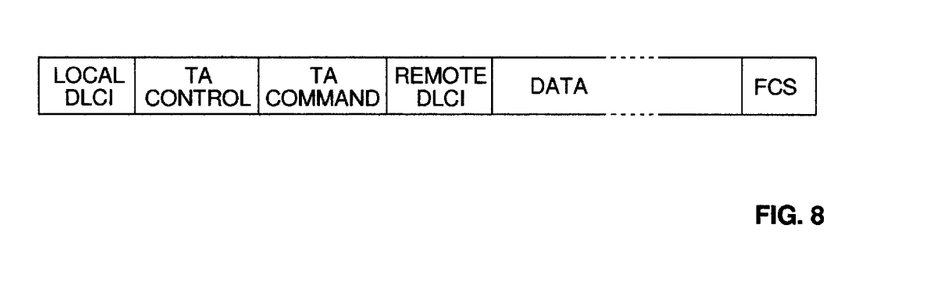
FIG. 8 is a diagram showing a format of a frame which a DTE transmits to a local TA.

At step 102, the DTE 12 creates a diagnostic frame such as shown in FIG. 8 by using the DLCI value obtained from the DLCI table. In FIG. 8, the first local DLCI contains a DLCI value "14" which represents the local TA 18. The next TA control is a 1-byte field, and the definition of each bit is as follows.

Bit 0: Command/Response (C/R) indicator
Bit 1: Local TA indicator
Bit 2: Remote TA indicator
Bits 3 to 7: Reserved The C/R indicator indicates whether the subject frame is a command frame or response frame. It is assumed here that the C/R indicator indicates a command frame when it is on while it indicates a response frame when it is off. The local TA indicator, if it has been set, indicates that the destination of a command frame or the source of a response frame is a local TA. The remote TA indicator, if it has been set, indicates that the destination of a command frame or the source of a response frame is a remote TA. If both the local and remote TA indicators are set on in a command frame, the command frame is sent to both the local and remote TAs.

The next TA command field is also a 1-byte field and includes a command to be executed by a selected TA. Commands used in this embodiment are Loopback and Get Status. The remote DLCI field includes a DLCI value (200 or 300 in the above example) which is assigned to the communication with a remote DTE associated with a remote TA to be diagnosed. The data field includes data which is sent from the DTE 12 to a TA to be diagnosed (in case of a loopback test), or data which is sent from that TA to the DTE 12 (loopback data or status data). The command frame for Get Status does not include the data field. The FCS at the end is a frame check sequence and is checked by a TA which receives it.

After creating the above described diagnostic frame, the DTE 12 transmits that frame to the TA 18 and sets a timer at step 103. It then waits at step 104 for a response (response frame) to the diagnostic command. If a response is received before the expiration of the timer or time-out is detected at step 105, data included in the data field of the response frame is analyzed and its results are recorded at step 106. If the time-out is detected at step 105, the DTE 12 records an error and retransmits the diagnostic frame.

The microprocessor 30 of the TA 18 performs operations shown in FIG. 6 when it receives a frame from the DTE 12 through the terminal interface 38 and the SCA 36. In FIG. 6, the microprocessor 30 checks the FCS residing at the end of the frame at the first step 201. If an FCS error is detected, the frame is discarded at step 202. Since a response frame is not transmitted to the DTE 12 in that case, time-out is detected at step 105 in FIG. 5. If there is no FCS error, the DLCI at the head of the frame is checked at step 203. If it is a local DLCI, a TA indicator is checked at step 204. If the DLCI is not a local DLCI, the flow goes to step 205 in which the frame is sent out to the network 10 through the SCA 36 and the line interface 40. At step 204, bits 1 and 2 of the TA control field are checked. The flow goes to step 206 if bit 1 or local TA indicator is on, and to step 207 if bit 2 or remote TA indicator is on. With the local TA indicator being on, the microprocessor 30 decodes a command in the TA command field of the received frame at step 206, and executes it at step 208. For Loopback, the microprocessor 30 writes the data residing in the data field of the frame into the RAM 34, then immediately reads out the same data and inserts it into the data field of a response frame which is created at the next step 209. For Get Status, the microprocessor 30 inserts status data indicating the status of the TA 18 into the data field of the response frame.

The microprocessor 30 creates the response frame at step 209 by turning off the C/R indicator in the TA control field in the frame shown in FIG. 8, inserting either the data read out from the RAM 34 in the loopback or the status data into the data field and calculating the FCS. The other fields may be the same as those in the command frame received from the DTE 12. The microprocessor 30 transmits the response frame to the DTE 12 at step 210 and then waits for a new frame to be transmitted from the DTE 12 or the network 10.

Figure 9:
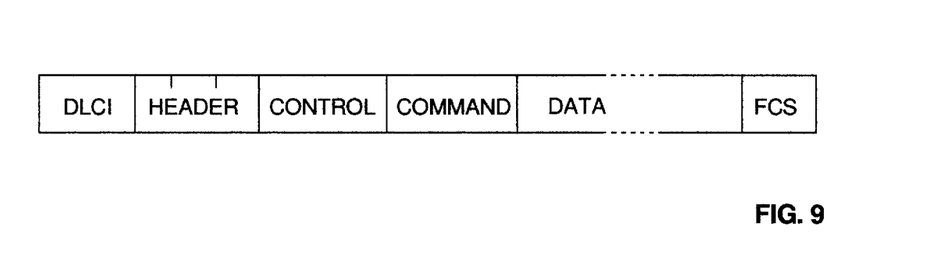
FIG. 9 is a diagram showing a format of a frame which a local TA transmits to a remote TA.

If the remote TA indicator is on at step 204, the microprocessor 30 creates a remote frame at step 207, which is to be transmitted to a remote TA. FIG. 9 shows the format of a remote frame. In FIG. 9, the first DLCI is a remote DLCI which was included in the command frame from the DTE 12. The next header includes three 1-byte invalid characters described above. In the next 1-byte control field, bit 0 is the previously described C/R indicator, and bits 1–7 are reserved. The control field may be the same as the TA control field in the frame of FIG. 8. The command and data fields are those which were received from the DTE 12. The microprocessor 30 finally calculates the FCS, inserts it into the FCS field, and transmits the remote frame thus created to the network 10. If both the local and remote TA indicators are on, the local sequence comprising steps 206, 208, 209, and 210 and the remote sequence comprising steps 207 and 205 are sequentially executed. Although the order of these sequences may be arbitrary, it is preferred from the view point of efficiency of the entire diagnosis that the remote sequence is first executed.

The network 10 distributes the frame sent out from the TA 18 at step 205, to the remote TA identified by the DLCI value. In the remote TA which receives the frame, e.g. the TA 22, its microprocessor performs operations shown in FIG. 7. The first step 301 is the same as step 201 in FIG. 6. If an FCS error is detected, the flow goes to step 302 in which the received frame is discarded. If there is no error, it is checked at step 303 whether the DLCI in the received frame has been assigned to the communication with the associated DTE 16. If not, the frame is discarded at step 302. If the DLCI has been assigned to the communication with the DTE 16, the flow goes to step 304 in which it is checked whether there are three 1-byte invalid characters following the DLCI. This step may be executed by a simple compare command. If invalid characters are not detected which indicates normal data communication, the microprocessor of the TA 22 transmits the frame to the DTE 16 at step 305. Command decode step 306 and command execute step 307, which occur after the detection of the invalid characters, are the same as steps 206 and 208 in FIG. 6, respectively. Step 308 to create a response frame is basically the same as step 209 in FIG. 6, in which the C/R indicator in the control field is turned off and either the loopback data or the status data is inserted into the data field. Although the header consisting of three invalid characters, and the command field are not required in the response frame, they may be left in the frame. After the microprocessor of the TA 22 transmits the response frame to the network 10 at step 309, it waits for a new frame transmitted from the DTE 16 or the network 10.

Since the frame sent out from the TA 22 to the network 10 includes the DLCI "300" which has been assigned to the communication between the DTE 12 and the DTE 16, the network 10 distributes this frame to the TA 18. Upon receipt of the response frame from the TA 22, the TA 18 performs operations similar to those shown in FIG. 7. It should be noted, however, that if the header consisting of the invalid characters is included in the response frame, a step for checking the C/R indicator would have to be executed after step 304. If the C/R indicator is off, the frame is sent to the DTE 12, and if the C/R indicator is on, indicating a diagnostic command frame from a remote DTE, step 306 and succeeding steps are executed.

In the above described embodiment, a frame (FIG. 8) which is transmitted from a local DTE to a local TA has a different format from that of a frame (FIG. 9) which is transmitted from a local TA to a remote TA, and thus the local TA has to perform format conversion at step 207. However, a frame shown in FIG. 9 may be transmitted from a local DTE which performs diagnosis. Operations of the local TA in that case are shown in FIG. 10.

Figure 10:
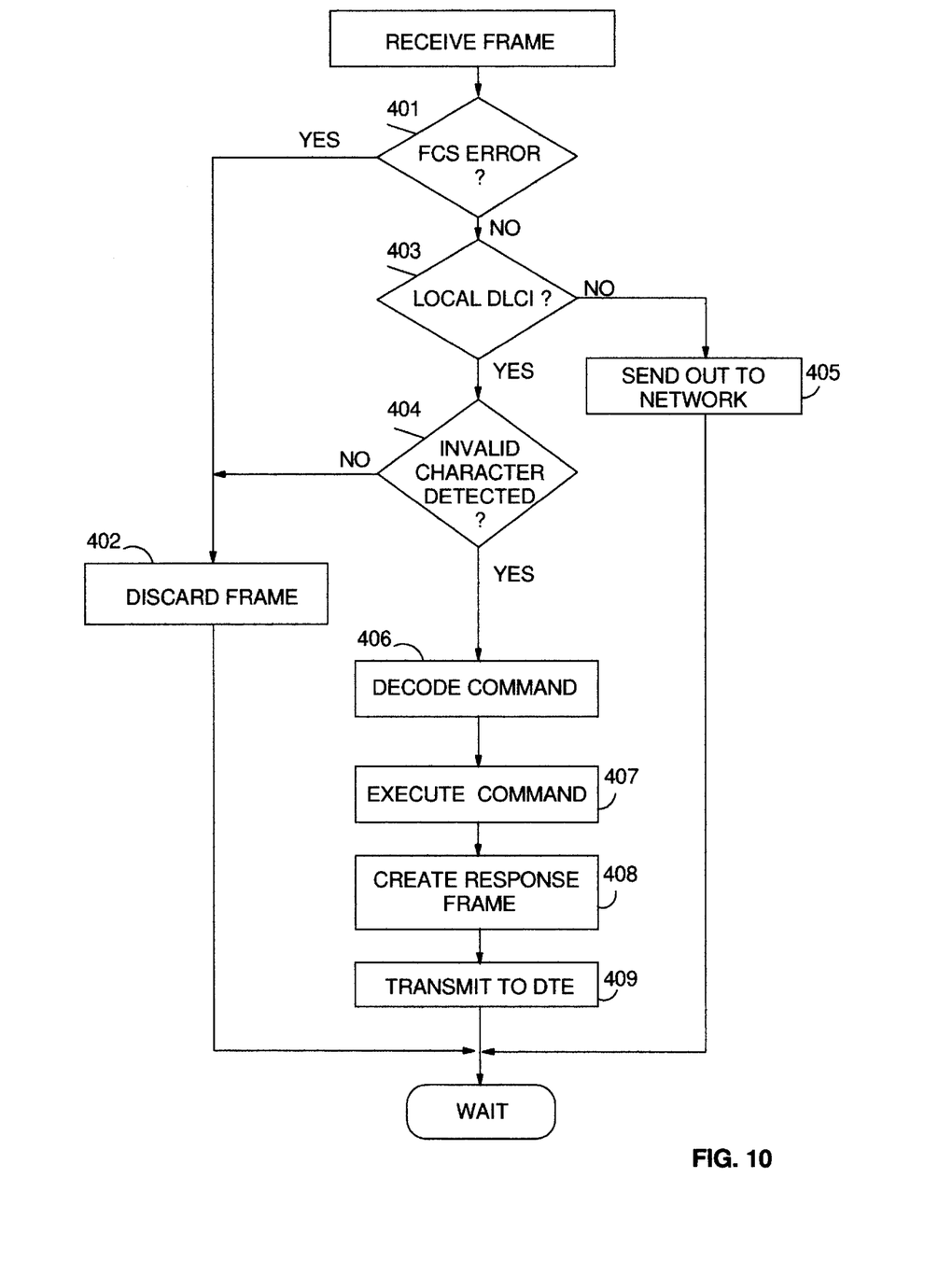
FIG. 10 is a flowchart showing operations of a local TA when a DTE transmits a frame of FIG. 9.

In FIG. 10, FCS error check step 401, frame discard step 402, local DLCI check step 403, and network transmission step 405 are identical to steps 201, 202, 203, and 205, respectively, in FIG. 6. If, at step 403, a local DLCI is detected, the microprocessor of the local TA checks at step 404 whether the following three bytes include invalid characters. If the invalid characters are not detected, the flow goes to step 402, and if the invalid characters are detected, step 406 and succeeding steps are executed. Command decode step 406, command execute step 407, response frame create step 408, and return step 409 are identical to steps 206, 208, 209, and 210 in FIG. 6, respectively. In this second embodiment, the aforementioned TA indicator is not required since the DLCI residing at the head of the frame transmitted from the DTE indicates either a local TA or a remote TA.

Although the preferred embodiments of the present invention have been described, the present invention is not limited thereto, and various modifications are possible. For example, the frame relay network 10 may employ the global addressing system. In that case, different DLCIs are respectively assigned to the individual DTEs connected to the network and, therefore, the DLCI in a frame which is sent from a local DTE to a remote DTE differs from the one in a frame which is sent as a response from the remote DTE to the local DTE.

We claim:

1. For use in a communication network having a plurality of terminals, each of which is connected to the network through a local adapter, said terminals transmitting data frames, each frame including an address field having an address unique to the intended destination of the frame, method for managing communications between terminals and adapters, comprising the steps of:

at a local terminal, retrieving the addresses of both the local adapter and a remote adapter;

at the local terminal, generating a frame including the local adapter address, a remote indicator indicating that the frame is intended for an adapter other than the local adapter, the remote adapter address and a command;

at the local terminal, transmitting the generated frame to the local adapter; and at the local adapter, detecting the remote indicator and forwarding the frame into the network for transmission to the remote adapter identified by the remote adapter address.

2. A method for managing communications as set forth in claim 1 wherein the local adapter, upon detection of the remote indicator, inserts at least one invalid character into a control field in the frame prior to forwarding the frame into the network.

3. A method for managing communications as set forth in claim 2 wherein the invalid character has a bit pattern that would not appear in a frame control field in frames intended for terminal to terminal data communication.

4. A method for managing communications as set forth in claim 3 including the further steps of:

at the remote adapter, receiving the frame and checking for the presence of the invalid character;

at the remote adapter, responding to the absence of the invalid character by transferring the frame to the terminal connected to the remote adapter or responding to the presence of the invalid character, by causing the command within the frame to be executed in the remote adapter without the frame being forwarded to the connected terminal.

* * * * *